Patented Apr. 7, 1925.

1,532,454

UNITED STATES PATENT OFFICE.

ROBERT SUCHY AND JOSEF MICHEL, OF GRIESHEIM-ON-THE-MAIN, GERMANY, ASSIGNORS TO THE FIRM CHEMISCHE FABRIK GRIESHEIM ELEKTRON, OF FRANKFORT-ON-THE-MAIN, GERMANY.

REFINING CRUDE ARSENIOUS OXIDE.

No Drawing.   Application filed July 3, 1924.  Serial No. 724,040.

*To all whom it may concern:*

Be it known that we, ROBERT SUCHY and JOSEF MICHEL, citizens of Austria and Germany, respectively, residing at Griesheim-on-the-Main, Germany, have invented certain new and useful Improvements in Refining Crude Arsenious Oxide, of which the following is a specification.

Our invention refers to the purification or refining of crude arsenious oxide (arsenious acid) and has for its object to effect this purification in a simpler and more economical manner than was hitherto possible.

Our invention is based on the reaction between arsenic oxide and sodium carbonate which takes place in accordance with the formula

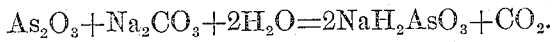
$As_2O_3 + Na_2CO_3 + 2H_2O = 2NaH_2AsO_3 + CO_2.$

It is well known that this reaction will also take place in an inverse sense, i. e. by treating sodium dihydrogen arsenite with carbonic acid gas there is formed arsenious oxide and sodium carbonate.

We have now ascertained that by first treating crude arsenious oxide with a hot solution of sodium carbonate, filtering the solution of sodium dihydrogen arsenite thereby obtained and thereafter introducing carbonic acid gas, there is obtained pure arsenious oxide. We have further ascertained that contrary to what could be expected, the quantity of sodium carbonate required is substantially not more than about three quarters and even less of the molecular quantity required for the formation of sodium dihydrogen arsenite, and the sodium carbonate solution resulting from the decomposition of the sodium arsenite solution by carbonic acid gas can be used repeatedly for the purification of further quantities of the crude product.

In practising our invention we prefer treating crude arsenious oxide with a hot 20 per cent solution of sodium carbonate. The solution of sodium arsenite thus formed and which contains about 25 per cent $As_2O_3$, is freed from the insoluble parts consisting of flue dust, carbon and metallic arsenic, by filtration. Into this solution carbonic acid gas is introduced under vigorous stirring or shaking. The introduction of the gas which is readily absorbed by the solution is continued until this latter is saturated and all arsenious oxide is precipitated whereupon the clear supernatant liquid is separated from the deposit by decantation and can be used without further treatment for the purification of fresh quantities of crude arsenious oxide. The pure oxide is dried and forms a powder which is better suited for many purposes than the arsenious oxide in lumps hitherto obtained by sublimation. Example:—200 parts by weight of crude arsenious oxide containing about 90 per cent $As_2O_3$ are treated at an elevated temperature with 70 parts by weight of sodium carbonate dissolved in water to form a 20 per cent solution until all the oxide is dissolved. The residue amounting to about 14.7 parts by weight of the total solids employed is separated by filtration and the solution is treated with carbonic acid gas under vigorous stirring. About 130 parts by weight of pure arsenious oxide are obtained as a deposit.

To the sodium carbonate solution separated therefrom a fresh quantity of 200 parts by weight of crude arsenious oxide are added and from this solution there are recovered with carbonic acid gas 150 parts by weight of pure $As_2O_3$. The mother liquor is then treated with further 200 parts by weight of crude arsenious oxide, yielding 180 parts of the pure product, being the total of the $As_2O_3$ added. In this way the process is carried on until the few impurities which are soluble in the sodium carbonate solution have accumulated therein to such an extent as to render necessary a purification of the mother liquor which may take place in any well known manner.

We wish it to be understood that we do not desire to be limited to the exact details, and more especially to the proportions and sequence of operations above described for obvious modifications will occur to a person skilled in the art.

We claim:—

1. The method of refining crude arsenious oxide comprising dissolving said oxide in a sodium carbonate solution, separating off the undissolved matter and treating the filtered solution with carbonic acid gas to precipitate pure arsenious oxide.

2. The method of refining crude arsenious oxide comprising dissolving said oxide in a sodium carbonate solution, separating off the undissolved matter, treating the filtered solution with carbonic acid gas to precipitate pure arsenious oxide, separating same from the sodium carbonate solution and using this latter for the purification of further quantities of crude arsenious oxide.

3. The method of refining crude arsenious oxide comprising dissolving said oxide in a solution of a quantity of sodium carbonate not exceeding 75 per cent of the quantity theoretically required for the formation of sodium dihydrogen arsenite, separating off the undissolved matter and treating the filtered solution with carbonic acid gas to precipitate pure arsenious oxide.

4. The method of refining crude arsenious oxide comprising dissolving 200 parts crude arsenious oxide at elevated temperature in a 20 per cent solution of 70 parts sodium carbonate, filtering off the undissolved matter, introducing carbonic acid gas into the liquor until all pure oxide is precipitated, filtering and drying said pure oxide and treating the mother liquor with a fresh quantity of crude oxide.

In testimony whereof we affix our signatures.

ROBERT SUCHY.
JOSEF MICHEL.

Witnesses:
JANE QUISTI,
ERIKA JAEGER.